US012460564B2

(12) United States Patent
Barreteau et al.

(10) Patent No.: US 12,460,564 B2
(45) Date of Patent: Nov. 4, 2025

(54) CRANKCASE VENTILATION SYSTEMS INCLUDING INTEGRATED SENSORS AND CONTROLLER

(71) Applicant: Cummins Filtration Inc., Nashville, TN (US)

(72) Inventors: Anthony Barreteau, Quimper (FR); Chirag D. Parikh, Madison, WI (US); Benjamin L. Scheckel, Stoughton, WI (US)

(73) Assignee: Cummins Filtration Inc., Nashville, TN (US)

( * ) Notice: Subject to any disclaimer, the term of this patent is extended or adjusted under 35 U.S.C. 154(b) by 0 days.

(21) Appl. No.: 18/588,900

(22) Filed: Feb. 27, 2024

(65) Prior Publication Data

US 2024/0200478 A1 Jun. 20, 2024

Related U.S. Application Data

(63) Continuation of application No. PCT/US2022/040423, filed on Aug. 16, 2022.
(Continued)

(51) Int. Cl.
*F01M 11/03* (2006.01)
*F01M 13/02* (2006.01)
(Continued)

(52) U.S. Cl.
CPC .......... *F01M 13/028* (2013.01); *F01M 13/04* (2013.01); *F01M 2013/0083* (2013.01); *F01M 2013/0438* (2013.01); *F01M 2250/60* (2013.01)

(58) Field of Classification Search
CPC .......... F01M 13/04; F01M 2013/0422; F01M 2013/0438; B01D 45/14; B01D 46/003; B01D 46/0056; F02D 41/22
(Continued)

(56) References Cited

U.S. PATENT DOCUMENTS 6,391,193 B1 5/2002 Luka
6,709,477 B1 * 3/2004 Håkansson ............... B04B 5/08
123/573
(Continued)

FOREIGN PATENT DOCUMENTS

CN 207493369 U 6/2018
CN 110090504 A 8/2019
(Continued)

OTHER PUBLICATIONS

Chinese Office Action issued for Chinese Patent Application No. 201880068383.2 issued May 31, 2021.
(Continued)

*Primary Examiner* — Logan M Kraft
*Assistant Examiner* — James J Kim
(74) *Attorney, Agent, or Firm* — Benesch Friedlander Coplan & Aronoff LLP

(57) ABSTRACT

A rotating crankcase ventilation system comprises a housing comprising an inlet and an outlet, a motor comprising a stator and a rotor, and a shaft. A first end of the shaft is coupled to the rotor and configured to rotate in response to rotation of the rotor. A filter element is coupled to the shaft. A sensor is configured to measure at least one operating parameter of the rotating crankcase ventilation system. A controller is operatively coupled to the sensor and the motor, the controller configured to receive the at least one operating parameter and selectively adjust operation of the motor to adjust rotation of the rotor, and thereby, the filter element based on the at least one operating parameter.

20 Claims, 6 Drawing Sheets

Related U.S. Application Data

(60) Provisional application No. 63/239,065, filed on Aug. 31, 2021.

(51) Int. Cl.
*F01M 13/04* (2006.01)
*F01M 13/00* (2006.01)

(58) Field of Classification Search
USPC .................................................. 123/196 A
See application file for complete search history.

(56) References Cited

U.S. PATENT DOCUMENTS

| | | | |
|---|---|---|---|
| 10,184,415 | B2 | 1/2019 | Shimpi et al. |
| 2006/0243258 | A1 | 11/2006 | Withrow et al. |
| 2009/0211959 | A1 | 8/2009 | Clint et al. |
| 2010/0170208 | A1 | 7/2010 | Matula et al. |
| 2011/0011380 | A1* | 1/2011 | Lagerlof .............. F01M 11/10 123/573 |
| 2011/0083625 | A1 | 4/2011 | Lyons |
| 2011/0197761 | A1 | 8/2011 | Matsuzaki et al. |
| 2013/0056407 | A1* | 3/2013 | Parikh .................. F02D 23/00 210/360.1 |
| 2014/0109653 | A1* | 4/2014 | Chan .................. B01D 46/0084 73/38 |
| 2019/0162089 | A1 | 5/2019 | Ekeroth et al. |
| 2019/0210039 | A1* | 7/2019 | Kuhn ..................... B04B 7/16 |
| 2020/0063650 | A1* | 2/2020 | Muramatsu .......... F02B 37/186 |
| 2023/0063997 | A1* | 3/2023 | Kado .................... F04C 29/021 |

FOREIGN PATENT DOCUMENTS

| | | |
|---|---|---|
| CN | 111594304 A | 8/2020 |
| DE | 10044922 A1 | 4/2002 |
| DE | 20 2016 106 587 U1 | 4/2018 |
| EP | 1 464 797 A2 | 10/2004 |
| EP | 1 614 871 A2 | 1/2006 |
| EP | 2 167 235 B1 | 3/2010 |
| EP | 2 855 025 B1 | 4/2015 |
| GB | 2 572 600 | 10/2019 |
| JP | 2008-188522 A | 8/2008 |
| JP | 2009-150291 A | 7/2009 |
| KR | 623652 B1 | 9/2006 |
| KR | 20080043474 A | 5/2008 |
| WO | WO-2004/104381 A1 | 12/2004 |
| WO | WO-2010/131861 A2 | 11/2010 |
| WO | WO-2012/002960 A1 | 1/2012 |
| WO | WO-2017/066169 A1 | 4/2017 |

OTHER PUBLICATIONS

International Search Report and Written Opinion issued for PCT Application No. PCT/US2022/040423 issued Dec. 28, 2022, 32 pages.

* cited by examiner

FIG. 3

CRANKCASE VENTILATION SYSTEMS INCLUDING INTEGRATED SENSORS AND CONTROLLER

CROSS-REFERENCE TO RELATED APPLICATIONS

This Application is a continuation of PCT Application No. PCT/US2022/040423, filed Aug. 16, 2022, which claims priority to U.S. Provisional Application No. 63/239,065 filed Aug. 31, 2021. The contents of these applications are hereby incorporated by reference in its entirety.

TECHNICAL FIELD

The present application relates generally to rotating crankcase ventilation filter assemblies for use with internal combustion engine systems.

BACKGROUND

During operation of an internal combustion engine, a fraction of combustion gases can flow out of the combustion cylinder and into the crankcase of the engine. These gases are often referred to as "blowby" gases. The blowby gases include a mixture of aerosols, oils, and air. If vented directly to the ambient, the aerosols contained in the blowby gases can harm the environment. Accordingly, the blowby gases are often routed out of the crankcase via a crankcase ventilation system. The crankcase ventilation system may pass the blowby gases through a coalescer (i.e., a coalescing filter element) to remove a majority of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating crankcase ventilation filter elements, for example, rotating coalescer elements that increase the filter efficiency of crankcase ventilation systems by rotating the coalescer element during filtering. In rotating coalescer elements, the contaminants (e.g., oil droplets suspended and transported by blowby gases) are separated at least in part by centrifugal separation techniques. Additionally, the rotation of the coalescer element can create a pumping effect, which reduces the pressure drop through the crankcase ventilation system.

Various conventional crankcase ventilation systems are coupled to and controlled by a central controller, for example, an engine control module (ECM). This makes the crankcase ventilation system dependent on the control signals being generated by the central controller, which can vary from one system to another. Such conventional crankcase ventilation systems, thus have to be modified for the specific system into which the crankcase ventilation system is intended to be installed, which increases manufacturing cost and complexity.

SUMMARY

Embodiments described herein relate generally to rotating crankcase ventilation systems that include an integrated controller for controlling the operations of the crankcase ventilation system independent of a central controller. In particular, embodiments described herein relate to crankcase ventilation systems that include an integrated controller and sensors that generate one or more signals corresponding to operating parameters of the rotating crankcase ventilation system, and the controller activates the rotating crankcase ventilation system based on the at least one operating parameter.

In a set of embodiments, a rotating crankcase ventilation system comprises a housing comprising an inlet and an outlet, a motor comprising a stator and a rotor, and a shaft. A first end of the shaft is coupled to the rotor and configured to rotate in response to rotation of the rotor. A filter element is coupled to the shaft. A sensor is configured to measure at least one operating parameter of the rotating crankcase ventilation system. A controller is operatively coupled to the sensor and the motor. The controller is configured to receive the at least one operating parameter and selectively adjust operation of the motor to adjust rotation of the rotor, and thereby the filter element, based on the at least one operating parameter.

In another set of embodiments, a controller operatively coupled to a sensor of a rotating crankcase ventilation system comprises a memory configured to store instructions. The controller comprises one or more modules configured to measure at least one operating parameter of a ventilation system. The controller comprises a processor communicably connected to the memory and configured to execute the instructions. The instructions, when executed, cause the processor to selectively adjust operation of a motor of the ventilation system by adjusting a rotation of a rotor of the motor, and thereby a filter element, based on one or more of the at least one operating parameter measured by the one or more modules.

In yet another set of embodiments, a method of selectively controlling a motor of a rotating crankcase ventilation system comprises receiving, by a controller of the rotating crankcase ventilation system, an operating parameter. The method comprises determining, by the controller, whether the operating parameter is greater than or equal to a threshold. The method comprises activating, by the controller, the motor responsive to determining the operating parameter is greater than or equal to the threshold.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3 is a schematic illustration of a portion of a filter media that may be used in the system of FIG. 2, showing the mechanism of coalescence of aerosols and/or oil due to rotation of the filter media.

Figure 1:
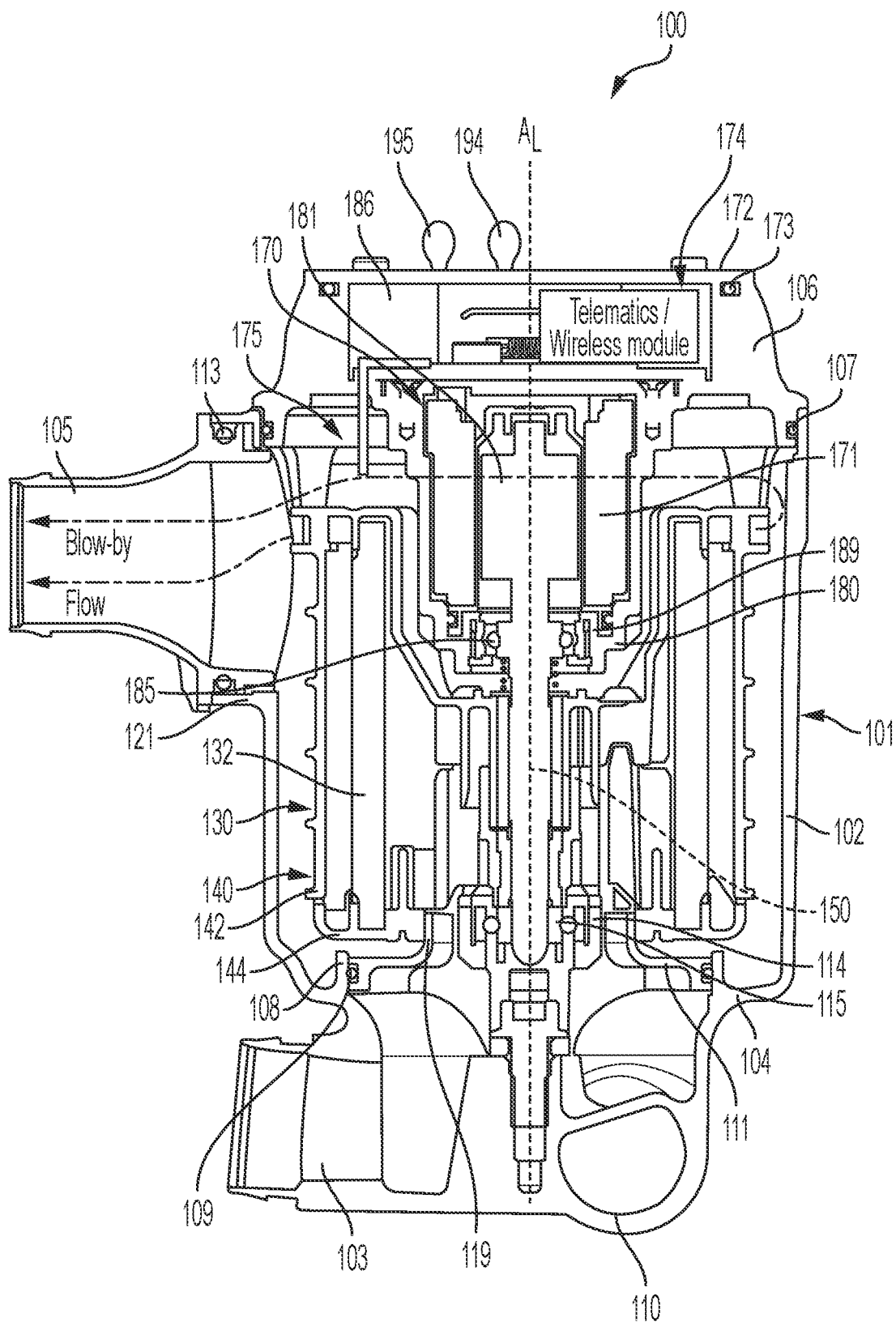
FIG. 1 is a side cross-section view of a rotating crankcase ventilation system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to rotating crankcase ventilation systems that include an integrated controller for controlling the operations of the crankcase ventilation system independent of a central controller. In particular, embodiments described herein relate to crankcase ventilation systems that include an integrated controller and sensors that generate one or more signals corresponding to operating parameters of the rotating crankcase ventilation system, with the controller activating the rotating crankcase ventilation system based on the at least one operating parameter.

Various conventional crankcase ventilation filter assemblies are coupled to and controlled by a central controller, for example, an engine control module (ECM). This makes the crankcase ventilation system dependent on the control signals being generated by the central controller, which can vary from system to system. Such conventional crankcase ventilation systems thus have to be modified for the specific system within which the crankcase ventilation system is intended to be installed, which increases manufacturing costs and complexity.

In contrast, various embodiments of the rotating crankcase ventilation systems described herein may provide one or more benefits including, for example (1) integrating sensors and a controller within a crankcase ventilation system, thereby making the operations of the crankcase ventilation system independent of a central controller; (2) enabling integration into any engine without having to modify or adapt the crankcase ventilation system for any particular engine or central controller; (3) providing backward compatibility; (4) reducing installation cost and complexity; and (5) increasing installation flexibility.

Referring to FIG. 1, a rotating crankcase ventilation system 100 (hereafter the "system 100") is shown, according to an embodiment. The system 100 generally processes fluids, namely blowby gases received from an internal combustion engine crankcase to remove aerosols, oils, and other particulates contained in the crankcase blowby gases. The system 100 includes a housing 101, a filter element 130, a sensor 175, and a controller 174.

The housing 101 includes a housing main body 102 and a base 104 coupled to a first end of the housing main body 102. In some embodiments, the base 104 may be monolithically formed with the housing main body 102 as shown in FIG. 1. A mounting flange 110 may extend from the base 104 and is configured to be coupled to a support structure, for example, to an engine crankcase sump (not shown). A drain (not shown) may be defined through the base 104 or the mounting flange 110. Contaminants such as aerosols or oils that are separated from the blowby gases by the filter element 130 may be drained back to a crankcase sump via the drain.

A base plate 111 is disposed within a central opening defined by the base 104. A base plate seal member 109 (e.g., an O-ring or a gasket) is disposed between an inner peripheral wall 108 that extends axially upwards from an inner peripheral edge of the base 104, and an outer peripheral edge of the base plate 111, and forms a radial seal therebetween. A base plate inner wall 119 extends axially upwards from an inner peripheral edge of the base plate 111 into a central opening defined by a second endcap 144 of the filter element 130 so as to form a portion of a flow path for dirty blowby gases to flow into the filter element 130.

The base 104 includes a bearing mount flange 114 disposed radially inwards of the base plate inner wall 119. The bearing mount flange 114 is configured to mount a housing bearing 115 therein. Thus, a separate bearing mount plate is not used. The housing bearing 115 may be pre-loaded with a biasing member (e.g., a wave washer). The housing bearing 115 may be lubricated with aerosols or oil included in the incoming blow by gases flowing into the housing 101 via an inlet 103 defined in the base 104 of the housing 101, the inlet 103 being located upstream of the filter element 130. The positioning of the base plate 111 and the housing bearing 115 aligns an inflow of the blowby gases into the housing 101 such that the blowby gases flow axially into the filter element 130 and flow axially through the filter element 130.

The inlet 103 includes a conduit configured to deliver crankcase blowby gases to be filtered (e.g., from a crankcase of an internal combustion engine) into the housing main body 102. The inlet 103 may be monolithically formed with the base 104 of the housing 101. An outlet 105 is disposed in a wall of the housing main body 102 and is configured to communicate filtered blowby gases out of the housing 101 and to the internal combustion engine (in a closed crankcase ventilation system) or to the ambient (e.g., in an open crankcase ventilation system). In some embodiments, the outlet 105 may include a separate piece which is mounting within an outlet flange 121 defined on a sidewall of the housing main body 102, as shown in FIG. 1. An outlet seal member 113 (e.g., an O-ring or a gasket) is disposed between an outer peripheral surface of the outlet 105 and an inner surface of the outlet flange 121 so as to form a radial seal therebetween.

A motor 170 is disposed within the housing main body 102. The motor 170 includes a cover 106 coupled to a second end of the housing main body 102 opposite the first end. The cover 106 may be removably coupled to the housing main body 102, for example, via securing members (e.g., screws, bolts, nuts, etc.), threads, a snap-fit, or a friction-fit mechanism. A cover sealing member 107 is disposed between an outer peripheral edge of the cover 106 and an inner surface of the housing main body 102 so as to form a radial seal therebetween. In some embodiments, the cover 106 may include a cover plate 172 disposed on top of the cover 106 and coupled thereto, for example, via coupling members (e.g. screws, nuts, bolts, etc.). A cover plate sealing member 173 (e.g., an O-ring or gasket) may be disposed between 106 and a the cover plate 172, for example, within a groove defined in the cover 106, so as to provide an axial seal between the cover plate 172 and the cover 106. A motor connector (not shown) may be disposed on the cover plate 172 or the cover 106 and configured to be coupled to an electrical lead for providing electrical power to the motor 170 and the controller 174 from a power source (e.g., a lead-acid batter, a Li-ion battery, a Ni-Cad battery, an alternator, etc.). In some embodiments, the power source may comprise a 12V or 24V power source.

The motor 170 is disposed along a longitudinal axis $A_L$ of the housing 101. The motor 170 includes a stator 171 and rotor 181 disposed about the longitudinal axis $A_L$. The rotor 181 is disposed within a central cavity defined by the stator 171 and is configured to be coupled to a shaft 150 of the filter element 130, as described in further detail herein. At least a portion of the stator 171 is disposed within the cover 106. The stator 171 is supported by and coupled to a stator plate 180 that is disposed within the internal volume defined by the housing main body 102 and is located between the filter element 130 and the stator 171.

As shown in FIG. 1, the stator plate 180 defines a stator plate inner flange 189 extending axially from an inner rim of the stator plate 180 towards the stator 171 such that a radially outer surface of the stator plate inner flange 189 is disposed adjacent to a radially inner surface of the stator 171. A motor bearing 185 is secured within the stator plate inner flange 189 (e.g., press-fit, or shrink-fit). Forming the motor 170 static components in two parts with the stator 171 and the stator plate 180 allows the rotor 181 to be installed after the motor bearing 185 is fit into the stator plate inner flange 189. The motor bearing 185 may be lubricated (e.g., greased) for life. The motor bearing 185 fit provides a sufficient air gap between the stator 171 and a magnet laminate stack of the rotor 181. In some embodiments, the stator 171 may be overmolded and sealed with stator plate 180 either directly or with a separate sleeve to prevent ingress of blowby gases into the stator 171 or a controller compartment 186 of the stator 171.

A radially outer rim of the stator plate 180 is disposed against a radially inner surface of the housing main body 102. A stator plate outer sealing member 107 (e.g., an O-ring or gasket) is disposed between the outer rim of the stator plate 180 and the inner surface of the housing main body 102 so as to form a radial seal between the stator plate 180 and the housing main body 102. A controller compartment 186 is formed between the cover 106 and the cover plate 172 within which the controller 174 is disposed.

The filter element 130 is disposed within the housing main body 102 between the base 104 and the motor 170. The filter element 130 comprises a filter media 132, an endcap assembly 140, and in some embodiments, the shaft 150. The shaft 150 is disposed about the longitudinal axis $A_L$ of the system 100. The shaft 150 may be formed from metals (e.g., stainless steel, cast iron, aluminum, etc.) or any other suitable material. The shaft 150 includes a first end configured to be coupled to the rotor 181 of the motor 170, for example, using a securing member (e.g., screws, nuts, bolts, rivets, etc.) or press-fit thereto, such that the shaft 150 is configured to rotate in response to rotation of the rotor 181. A second end of the shaft 150 opposite the first end is configured to slide into the housing bearing 115 with a sliding fit to accommodate thermal expansion.

The endcap assembly 140 includes a first endcap 142 and the second endcap 144, with the filter media 132 secured between the first endcap 142 and the second endcap 144. In some embodiments, the filter media 132 comprises a wound filter media including a corrugated media layer interposed between two flat facing media layers such that axial flow forms are defined between the facing media layers and the corrugated media layer. An inner portion of the first endcap 142 may form a hub disposed circumferentially around the shaft 150 and coupled to the shaft 150 such that the first endcap 142 is rotationally locked with respect to the shaft 150.

A sensor 175 is integrated into the system 100 and is configured to measure at least one operating parameter of the system 100. In some embodiments, the sensor 175 may comprise a flow sensor (e.g., a hotwire sensor, an ultrasonic sensor, a differential pressure flow meter, etc.) and the at least one operating parameter comprises an outlet flow rate of a fluid (e.g., blowby gases) proximate to the outlet 105. In such embodiments, the sensor 175 may be disposed in the housing main body 102 or the cover 106 proximate to the outlet 105 and configured to measure the outlet flow rate of the fluid (e.g., blowby gases) as the fluid flows through the filter element 130 towards the outlet 105.

The controller 174 is operatively coupled to the sensor 175 and the motor 170. The controller 174 is configured to receive the at least one operating parameter and selectively adjust operation of the motor 170 to adjust rotation of the rotor 181 (e.g., move the motor 170 between a rest position in which the rotor 181 is stationary, and an activated position in which the rotor 181 is rotating, and/or adjust a rotational speed of an already rotating rotor 181), and thereby the filter element 130. For example, the controller 174 may be configured to activate the motor 170 in response to the measured outlet flow rate being equal to or greater than a predetermined flow threshold. In some embodiments, the controller 174 is further configured to determine a target rotational speed of the filter element 130 based on the measured outlet flow rate, and adjust a rotational speed of the rotor 181 towards the target rotational speed. In this manner, the controller 174 can locally control the operations of the system 100 based on an operating parameter of the system 100 (e.g., an operating parameter such as flow rate of the fluid flowing through the system 100), and selectively cause rotation of the filter element 130 without an external electronic input from a central controller of an engine or any other assembly that the system 100 is installed in. This allows operative coupling of the system 100 with any engine or external system without having to modify the system 100 to be compatible with the engine or the external system.

In some embodiments, the system 100 may also include audio, visual, or audio-visual indicators to indicate to a user whether the system 100 is working properly, for example whether the filter element 130 is plugged, or the motor 170 is operating properly. In particular embodiments, a first indicator 194 (e.g., a green lamp or LED) is disposed on a surface of the system 100, for example, an outer surface of the cover plate 172 of the housing main body 102. The first indicator 194 is configured to activate or turn ON (e.g., in response to a signal received from the controller 174) when the motor 170 is activated and/or when the system 100 is functioning properly. The system 100 may also include a second indicator 195 (e.g., a red lamp or LED, a malfunction indicator lamp (MIL), an audible alarm, etc.) disposed on a surface of the system 100, for example, an outer surface of the cover plate 172 of the housing main body 102. The second indicator 195 may be configured to activate or turn ON (e.g., in response to a fault signal received from the controller 174) when the controller 174 detects a fault with the system 100 (e.g., determines that the filter element 130 is plugged).

In some embodiments, the controller 174 may be configured to receive signals corresponding to real time values of a speed of the rotor 181, a current draw of the motor 170, a voltage of the motor 170, a temperature of the motor 170 or internal volume of the housing 101, etc., from sensors integrated into the housing 101 or the motor 170, and determine whether system 100 is operating properly. In some embodiments, the controller 174 may include or is coupled to a telemetry module configured to communicate various operational parameters (e.g., real time values of speed, current draw, voltage, temperature, etc.), diagnostic alerts (e.g., alerts for incorrect rotational speed, operational voltage too high/too low, operational temperature too high/too low, etc.), and/or status of the system 100 to a user device, a dashboard of a vehicle, an infotainment system screen, the central controller (e.g., an ECM), or a remote server. The controller 174 may communicate such data via wired or wireless connections. In various embodiments, the sensor 175 may communicate directly with the controller 174 or through an intermediate system, for example, the central controller or a filtration monitoring system.

Figure 2:
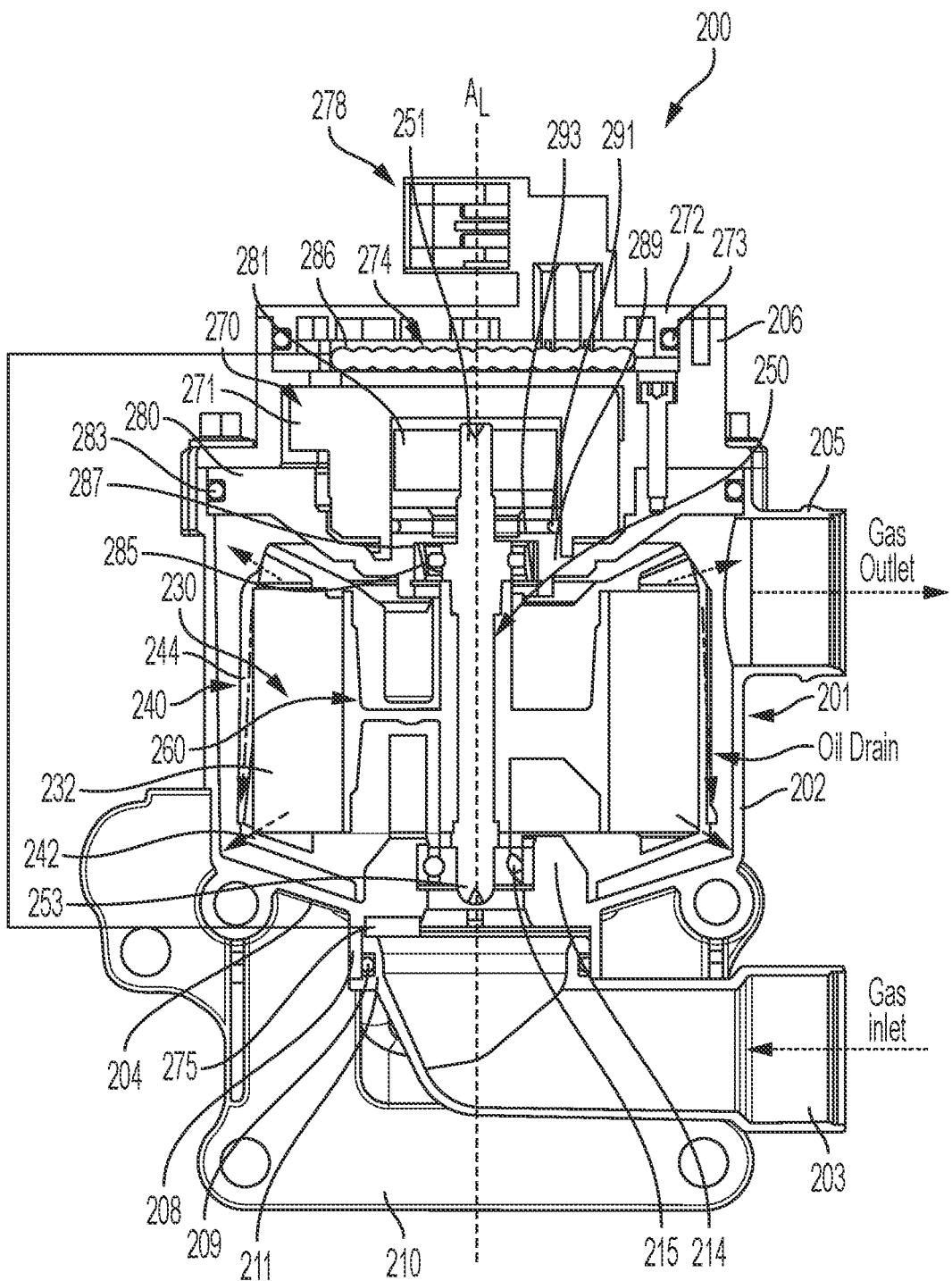
FIG. 2 is a side cross-section view of a rotating crankcase ventilation system, according to another embodiment.

FIG. 2 is a side cross-section view of a rotating crankcase ventilation system 200 (hereafter the "system 200"), according to another embodiment. The system 200 generally processes fluids, namely blowby gases received from an internal combustion engine crankcase to remove aerosols, oils, and other particulate contained in the crankcase blowby gases. The system 200 includes a housing 201, a filter element 230, a sensor 275, and a controller 274.

The housing 201 includes a housing main body 202 and a base 204 coupled to a first end of the housing main body 202. In some embodiments, the base 204 may be monolithically formed with the housing main body 202 as shown in FIG. 2. A mounting flange 210 extends from the base 204 and is configured to be coupled to a support structure, for example, to an engine crankcase sump (not shown). A drain may be defined through the mounting flange 210. Contaminants such as aerosols or oils that are separated from the blowby gases by the filter element 230 may be drained back to the crankcase sump via the drain.

As shown in FIG. 2, the base 204 includes a bearing mount flange 214 extending axially from an inner rim of the base 204 into the internal volume defined by the housing main body 202. The bearing mount flange 214 is configured to mount a housing bearing 215 therein. Thus, a separate bearing mount plate is not used. The housing bearing 215 may be pre-loaded with a biasing member (e.g., a wave washer). The housing bearing 215 may be lubricated with aerosols or oil included in the incoming blow by gases flowing into the housing 201 via an inlet 203. The positioning of the housing bearing 215 is configured to align an inflow of the blowby gases into the housing 201 such that the blowby gases flow axially into the filter element 230 and flow axially through the filter element 230.

The inlet 203 includes a conduit configured to deliver crankcase blowby gases to be filtered (e.g., from a crankcase of an internal combustion engine) into the housing main body 202. The base 204 also includes an inlet flange 208 extending axially from the inner rim of the base 204 away from the housing main body 202. The inlet flange 208 is configured to receive an inlet mounting end 211 of the inlet 203 and be coupled thereto. An inlet sealing member 209 (e.g., an O-ring or gasket) is disposed circumferentially between the inlet flange 208 and the inlet mounting end 211 to form a radial seal and prevent leakage of blowby gases or the coalesced contaminants. An outlet 205 is defined in a wall of the housing main body 202 and is configured to communicate filtered blowby gases out of the housing 201 and to the internal combustion engine (in a closed crankcase ventilation system) or to the ambient (e.g., in an open crankcase ventilation system).

A motor 270 is disposed within the housing main body 202. The motor 270 includes a cover 206 coupled to a second end of the housing main body 202 opposite the first end. The cover 206 may be removably coupled to the housing main body 202, for example via securing members (e.g., screws, bolts, nuts, etc.), threads, a snap-fit, or a friction-fit mechanism. In some embodiments, the cover 206 may include a cover plate 272 disposed radially within an inner rim defined by the cover 206. A cover plate sealing member 273 (e.g., an O-ring or gasket) may be disposed between a radially inner sidewall of the cover 206 and a radially outer periphery of the cover plate 272 to provide a radial seal between the cover plate 272 and the cover 206. A motor connector 278 (e.g., an electric connector such as a male or female connector) is disposed on the cover plate 272 and configured to be coupled to an electrical lead for providing electrical power to the motor 270.

The motor 270 is disposed along a longitudinal axis $A_L$ of the housing 201. The motor 270 includes a stator 271 and rotor 281 disposed about the longitudinal axis $A_L$. The rotor 281 is disposed within a central cavity defined by the stator 271 and is configured to be coupled to a shaft 250 of the filter element 230, as described in further detail herein. At least a portion of the stator 271 is disposed within the cover 206. The stator 271 is supported by and coupled to a stator plate 280 that is disposed within the internal volume defined by the housing main body 202 and is located between the filter element 230 and the stator 271.

As shown in FIG. 2, the stator plate 280 defines a stator plate inner flange 289 extending axially from an inner rim of the stator plate 280 towards the stator 271 such that a radially outer surface of the stator plate inner flange 289 is disposed adjacent to a radially inner surface of the stator 271. A stator plate inner sealing member 291 (e.g., an O-ring or a gasket) is disposed between the radially outer surface of the stator plate inner flange 289 and the radially inner surface of the stator 271 so as to form a radial seal therewith.

The stator plate inner flange 289 includes a bearing ledge 293 extending radially inwards from an end of the stator plate inner flange 289 such that a groove is formed for receiving a motor bearing 285. The motor bearing 285 may be secured in the groove using a tolerance ring, press-fit, or shrink-fit. In some embodiments, a biasing member 287 (e.g., a wave washer) to provide pre-loading to the end of the shaft 250 that is disposed in the motor bearing 285. Forming the motor 270 static components in two parts with the stator 271 and the stator plate 280 allows the rotor 281 to be installed after the motor bearing 285 is fit into the stator plate inner flange 289. The motor bearing 285 may be lubricated (e.g., greased) for life. The motor bearing 285 fit provides a sufficient air gap between the stator 271 and a magnet laminate stack of the rotor 281. In some embodiments, the stator 271 may be overmolded and sealed with stator plate 280 either directly or with a separate sleeve to prevent ingress of blowby gases into the stator 271 or a controller compartment 286 defined between the cover 206 and the cover plate 272 within which the controller 274 may be disposed.

A radially outer rim of the stator plate 280 is disposed against a radially inner surface of the housing main body 202. A stator plate outer sealing member 283 (e.g., an O-ring or gasket) is disposed between the outer rim of the stator plate 280 and the inner surface of the housing main body 202 so as to form a radial seal between the stator plate 280 and the housing main body 202.

The filter element 230 is disposed within the housing main body 202 between the base 204 and the motor 270. The filter element 230 comprises a filter media 232, an endcap assembly 240, a shaft 250, and a hub 260. The shaft 250 is disposed about the longitudinal axis $A_L$ of the system 100. The shaft 250 may be formed from metals (e.g., stainless steel, cast iron, aluminum, etc.) or any other suitable material. The shaft 250 includes a first end 251 configured to be coupled to the rotor 281 of the motor 270, for example, using a securing member (e.g., screws, nuts, bolts, rivets, etc.) or press-fit thereto, such that the shaft 250 is configured to rotate in response to rotation of the rotor 281. A second end 253 of the shaft 250 opposite the first end 251 is configured to slide into the housing bearing 215 with a sliding fit to accommodate thermal expansion. A biasing member (e.g., a wave washer or spring) that may be disposed around the housing bearing 215 may preload the second end 253 of the shaft 250.

The shaft 250 includes a shaft main body. A first bearing mount surface extends axially from the shaft main body. The first bearing mount surface is defined proximate to the first end 251 of the shaft 250 and is configured to be mounted within the motor bearing 285. A second bearing mount surface extends axially from the shaft main body and is defined proximate to the second end 253 of the shaft 250 and is configured to be positioned within the housing bearing 215. The second bearing mount surface may have a smaller diameter than the shaft main body such that only the second end 253 of the shaft 250 is insertable into the housing bearing 215 up to the second bearing mount surface, and the larger diameter shaft main body cannot be inserted into the housing bearing 215. In some embodiments, a length of the shaft 250 beyond the second bearing mount surface is shorter than a length of the shaft 250 beyond the first bearing mount surface.

A hub 260 is disposed circumferentially around the shaft 250 and is coupled to the shaft 250 such that the hub 260 is rotationally locked with respect to the shaft 250. In some embodiments, the hub 260 includes a hub inner flange disposed circumferentially around the shaft 250.

Figure 3:
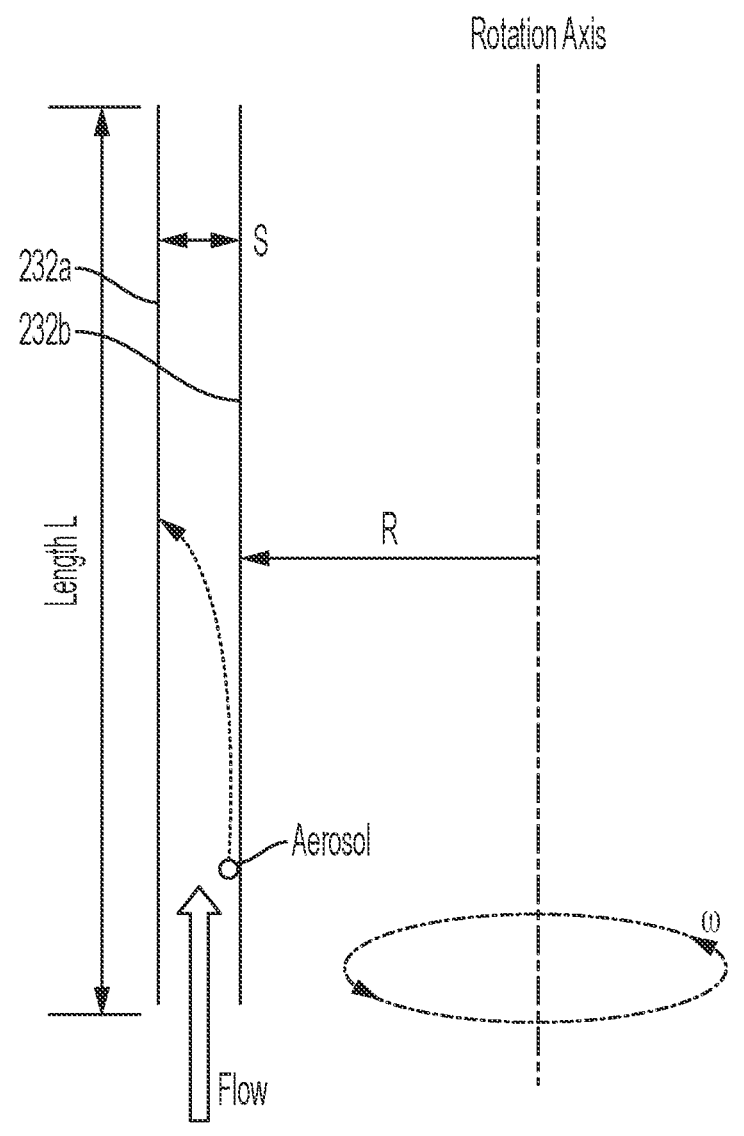

The filter media 232 is disposed around the hub 260 and secured to the hub 260. In some embodiments, the filter media 232 comprises a wound filter media 232 including a corrugated media layer interposed between two flat facing media layers such that axial flow channels are defined between the facing media layers and the corrugated media layer. FIG. 3 shows a pair of filter media layers 232a/b of the filter media 232 having a length L that are spaced apart from each other by a setting distance S. The (first) radially inner filter media layer 232a of the pair of filter media layers 232a/b is located at a radial distance R from a rotational axis of the filter media 132, which is defined by the longitudinal axis $A_L$. Blowby gases enter axially between the pair of filter media layers 232a/b. Rotation of the shaft 250 at a rotational velocity @ causes the rotationally locked hub 260 and the filter media 232 to rotate with the shaft 250. The aerosol or oil experience G forces and get separated from blowby flow. Separated aerosol and liquid coalesces in the axial flow channel between the pair of filter media layers 232a/b and forms a film of oil which travels up towards the outlet of the channel as shown in FIG. 3. The film then gets shed towards an inner wall of a second (top) endcap 244. The oil then drains into a gap between the inner wall of the second endcap 244 and the filter media 232. Oil drains towards the openings at the bottom of the filter element 230 at the outer diameter of the filter media 232 due to G forces created by the conical shape of the second endcap 244. The separated oil gets drained from the filter element 230 into a collection chamber defined in the base 204, for example, via drain openings created between a second endcap sidewall of the second endcap 244 and a first endcap 242. The collected oil aerosol or oils can then be drained back to the engine. Various embodiments of the endcap assembly 240 are described in detail in PCT Application No. PCT/US2019/033238, entitled "Anti-Rotation Features for Crankcase Ventilation Filters" and the entire disclosure of which is incorporated herein by reference.

In some embodiments, the endcap assembly 240 comprises the first endcap 242 disposed on a filter media first end that is proximate to the base 204. The second endcap 244 is disposed on a filter media second end that is opposite the filter media first end. The second endcap 144 includes the second endcap sidewall extending axially from a radially outer rim of second endcap 244 towards the first endcap 242 and is coupled to a radially outer rim of the first endcap 242 (e.g., welded or bonded via an adhesive). The filter media 232 and the hub 260 are secured between the first endcap 242 and the second endcap 244, and are disposed within the endcap assembly 240. A plurality of first endcap apertures may be defined in the first endcap 242 and configured to allow blowby gases to enter the endcap assembly 240 and flow axially through the filter media 232. A plurality of second endcap openings may be defined in the second endcap 244 and are configured to allow filtered blowby gases to exit the filter element 230 therethrough.

A sensor 275 is integrated into the system 200 and is configured to measure at least one operating parameter of the system 200. In some embodiments, the sensor 275 may include a pressure sensor disposed proximate to the inlet 203 and the at least one operating parameter comprises an inlet pressure of a fluid (e.g., blowby gases) flowing into the inlet 203, such that the sensor 275 is configured to measure the inlet pressure. The controller 274 is operatively coupled to the sensor 275. For example, a sensor manifold may extend from the inlet 203 to the controller compartment 286, and an electrical lead may extend through the sensor manifold to electrically couple the sensor 275 to the controller 274. In other embodiments, the sensor 275 may communicate wirelessly with the controller 274. The sensor 275 may be located on either side of the filter element 230.

The controller 274 is configured to receive a signal corresponding to the measured inlet pressure from the sensor 275 and activate the motor 270 responsive to the measured inlet pressure being equal to or greater than a predetermined threshold pressure. In some embodiments, the controller 274 is further configured to adjust a rotational speed of the rotor 281 to achieve a target inlet pressure based on the measured inlet pressure. In this manner, high filtering efficiency and performance may still be achieved even if the filter element 230 is highly plugged.

In this manner, the controller 274 can locally control the operations of the system 200 based on the inlet pressure and selectively cause rotation of the filter element 230 without an external electronic input from a central controller associated with the engine the system 200 is associated with. This allows operative coupling of the system 200 with any engine or external system without having to modify the system 200 to be compatible with the engine or external system. In some embodiments, the system 200 may also include audio, visual, or audio-visual indicators to indicate to a user whether the system 100 is working properly, as described in detail with respect to the system 100.

While the systems 100 and 200 show particular embodiments of rotating crankcase ventilation systems, it should be appreciated that the concepts of the present disclosure are applicable to any rotating crankcase ventilation system including, but not limited, to axial flow systems, radial flow systems, media based systems, or cone stack based systems. Moreover, the controller 174/274 may be configured to perform other operations. For example, the controller 174/274 may be configured to determine a rotational speed of the rotor 181/281 (e.g., based on a current or voltage, feedback received from the motor 170/270, the inlet pressure, an outlet pressure, the outlet flow rate, etc.). In response to the rotational speed of the rotor 181 being above a threshold speed for a threshold period of time, the controller 174 may be configured to generate a fault signal indicative of the filter element 230 being plugged.

While system 100 and 200 include integrated sensors, in some embodiments, the controller 174/274 may be configured to additionally, or alternatively, communicate with one or more remote sensors and control operations of the system 100/200 and based on signals received from such remote sensors. Such sensors may include, but are not limited to an air restriction sensor, an oil pressure sensor, a temperature sensor, any other suitable sensor or combination thereof. The controller 174/274 may be configured to receive signals from the sensors via a wired or wireless signal, and the signals may be directly received from the remote sensors, or routed to the controller 174/274 via an intermediate system, for example, the central controller, an engine controller, or a filtration monitoring system.

Figure 4:
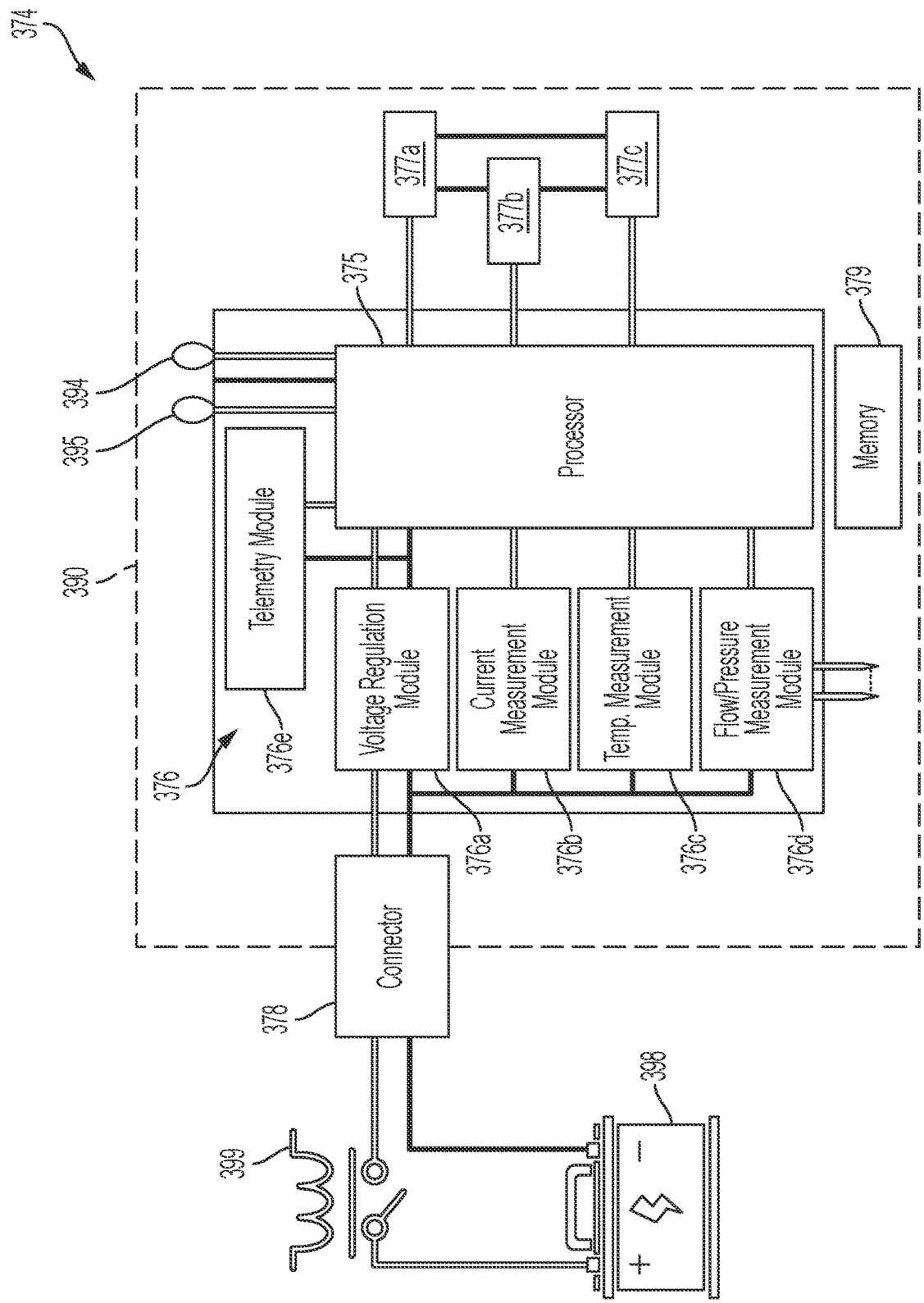
FIG. 4 is a schematic block diagram of a controller that may be included in the filter assembly of FIG. 1 or 2, according to an embodiment.

In particular embodiments, the controller 174 or 274 may include various circuitries or modules configured to perform the various operations described herein. For example, FIG. 4 shows a schematic block diagram of a controller 374, according to a particular embodiment, which may be used as the controller 174 in the system 100 or the controller 274 in the system 200. The controller 174 may include a processor 375, a memory 379, a plurality of modules 376, a first phase 377a, a second phase 377b, a third phase 377c, a connector 378, and a circuit board 390 (e.g., a printed circuit board (PCB)) on which various components of the controller 374 are disposed. The plurality of modules 376 may include a voltage regulation module 376a, a current measurement module 376b, a temperature measurement module 376c, a flow and/or pressure measurement module 376d, and a telemetry module 376e. It should be understood that the controller 374 shows only one embodiment of the controller 374 and any other controller capable of performing the operations described herein can be used.

The processor 375 can comprise a microprocessor, programmable logic controller (PLC) chip, an ASIC chip, or any other suitable processor. The processor 375 is in communication with the memory 379 and configured to execute instructions, algorithms, commands, or otherwise programs stored in the memory 379.

The memory 379 comprises any of the memory and/or storage components discussed herein. For example, memory 379 may comprise a RAM and/or cache of processor 375. The memory 379 may also comprise one or more storage devices (e.g., hard drives, flash drives, computer readable media, etc.) either local or remote to controller 374. The memory 379 is configured to store look up tables, algorithms, or instructions.

The phases 377a, 377b, 377c may be configured to provide redundancy in power communication to the processor and one or more of the plurality of modules 376 so that if one of the phases 377a, 377b, or 377c fails, another of the phases 377a, 377b, or 377c can ensure that electrical power is still communicated to the processor 375 and other components of the controller 374.

The connector 378 is configured to electrically couple the controller 374 to a power source 398 (e.g., a 12V or 24V power source). A relay 399 may be coupled to the electrical lines coupling the connector 378 to the power source 398. The relay 399 may selectively open or close to allow electrical power to be communicated to the controller 374. For example, the relay may open to prevent electrical power from being communicated to the controller 374 in case of a power surge or a short that may damage the components of the controller 374.

In some embodiments, the voltage regulation module 376a, the current measurement module 376b, the temperature measurement module 376c, the flow and/or pressure measurement module 376d, and the telemetry module 376e are embodied as machine or computer-readable media (e.g., stored in the memory 379) that is executable by a processor, such as the processor 375. As described herein and amongst other uses, the machine-readable media (e.g., the memory 379) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the voltage regulation module 376a, the current measurement module 376b, the temperature measurement module 376c, the flow and/or pressure measurement module 376d, and the telemetry module 376e are embodied as hardware units, such as electronic control units. As such, the voltage regulation module 376a, the current measurement module 376b, the temperature measurement module 376c, the flow and/or pressure measurement module 376d, and the telemetry module 376e may be embodied as one or more circuitry components including, but not limited to, processing circuitry, network interfaces, peripheral devices, input devices, output devices, sensors, etc.

In some embodiments, the voltage regulation module 376a, the current measurement module 376b, the temperature measurement module 376c, the flow and/or pressure measurement module 376d, and the telemetry module 376e may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the voltage regulation module 376a, the current measurement module 376b, the temperature measurement module 376c, the flow and/or pressure measurement module 376d, and the telemetry module 376e may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the voltage regulation module 376a, the current measurement module 376b, the temperature measurement module 376c, the flow and/or pressure measurement module 376d, and the telemetry module 376e may also include programmable hardware devices such as field programmable gate arrays, programmable array logic, programmable logic devices or the like. In this regard the voltage regulation module 376a, the current measurement module 376b, the temperature measurement module 376c, the flow and/or pressure measurement module 376d, and the telemetry module 376e may include one or more memory devices for storing instructions that are executable by the processor(s) of the voltage regulation module 376a, the current measurement module 376b, the temperature measurement module 376c, the flow and/or pressure measurement module 376d, and the telemetry module 376e. The one or more memory devices and processor(s) may have the same definition as provided below with respect to the memory 379 and the processor 375.

In the example shown, the controller 374 includes the processor 375 and the memory 379. The processor 375 and the memory 379 may be structured or configured to execute or implement the instructions, commands, and/or control processes described herein with respect to the voltage regulation module 376a, the current measurement module 376b, the temperature measurement module 376c, the flow and/or pressure measurement module 376d, and the telemetry module 376e. Thus, the depicted configuration represents the aforementioned arrangement within which the voltage regulation module 376a, the current measurement module 376b, the temperature measurement module 376c, the flow and/or pressure measurement module 376d, and the telemetry module 376e are embodied as machine or computer-readable media. However, as mentioned above, this illustration is not meant to be limiting as the present disclosure contemplates other embodiments such as the aforementioned embodiment where the voltage regulation module 376a, the current measurement module 376b, the temperature measurement module 376c, the flow and/or pressure measurement module 376d, and the telemetry module 376e, or at least one circuit of the voltage regulation module 376a, the current measurement module 376b, the temperature measurement module 376c, the flow and/or pressure measurement module 376d, and the telemetry module 376e are configured as a hardware unit. All such combinations and variations are intended to fall within the scope of the present disclosure.

The processor 375 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the voltage regulation module 376a, the current measurement module 376b, the temperature measurement module 376c, the flow and/or pressure measurement module 376d, and the telemetry module 376e) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 379 (e.g., RAM, ROM, Flash Memory, hard disk storage, etc.) may store data and/or computer code for facilitating the various processes described herein. The memory 379 may be communicably connected to the processor 375 to provide computer code or instructions to the processor 375 for executing at least some of the processes described herein. Moreover, the memory 379 may be or include tangible, non-transient volatile memory or non-volatile memory. Accordingly, the memory 379 may include database components, object code components, script components, or any other type of information structure for supporting the various activities and information structures described herein.

The plurality of modules 376a-e are configured to measure various parameters of the system 100/200 and control operations thereof. For example, the voltage regulation module 376a may be configured to regulate a voltage provided to the motor 170/270, for example, to activate the motor 170/270 and/or control the speed of the motor 170/270. The current measurement module 376b may be configured to measure a current being consumed by the motor 170/270, for example, to determine a speed of the motor 170/270. The current measurement module 376b may communicate the speed of the motor 170/270 to the voltage regulation module 376a so as to enable the voltage regulation module 376a to control a speed of the motor 170/270.

The temperature measurement module 376c may be configured to measure a temperature of the internal volume of the housing 101/201 (e.g., via a temperature sensor disposed within the housing 101/201), a temperature of the fluid (e.g., blowby gases) flowing into the system 100/200, or an oil temperature.

The flow and/or pressure measurement module 376d may be configured to receive an outlet flow rate signal from a flow rate sensor (e.g., the sensor 175), or an inlet pressure signal from an inlet pressure sensor (e.g., the sensor 275), and determine the outlet flow rate and the inlet flow rate therefrom. In some embodiments, the flow and/or pressure measurement module 376d may be configured to receive flow rate and or pressure signals from other locations of the system 100/200 or from remote sensors to determine flow rates and/or pressures at various locations of the systems 100/200 or of fluids external to the systems 100/200. The voltage regulation module 376a may use the measured outlet flow rate and/or inlet pressure to control activation of the motor 170/270 and/or a rotational speed of the motor 170/270, as previously described herein.

The telemetry module 376e may include wireless interfaces (e.g., jacks, antennas, transmitters, receivers, communication interfaces, wire terminals, etc.) for conducting data communications with various systems, devices, or networks. For example, the telemetry module 376e may include an Ethernet card and port for sending and receiving data via an Ethernet-based communications network and/or a Wi-Fi communication interface for communicating with the other modules 376a-376d, and/or systems external to the system 100/200 (e.g., a user device, a dashboard of a vehicle, an infotainment system screen, the central controller an ECM, or a remote server). The telemetry module 376e may be structured to communicate via local area networks or wide area networks (e.g., the Internet, etc.) and may use a variety of communications protocols (e.g., IP, LON, Bluetooth, ZigBee, radio, cellular, near field communication, etc.).

In some embodiments, the processor 375 may be communicatively coupled to a first indicator 394 (e.g., a green lamp or LED), and configured to activate or turn ON the first indicator 394 when the motor 170/270 is activated and/or when the system 100/200 is functioning properly. The processor 375 may also be communicatively coupled to a second indicator 395 (e.g., a red lamp or LED, a MIL, an audible alarm, etc.) and configured to activate the second indicator 395 when the controller 374 detects a fault with the system 100/200.

Figure 5:
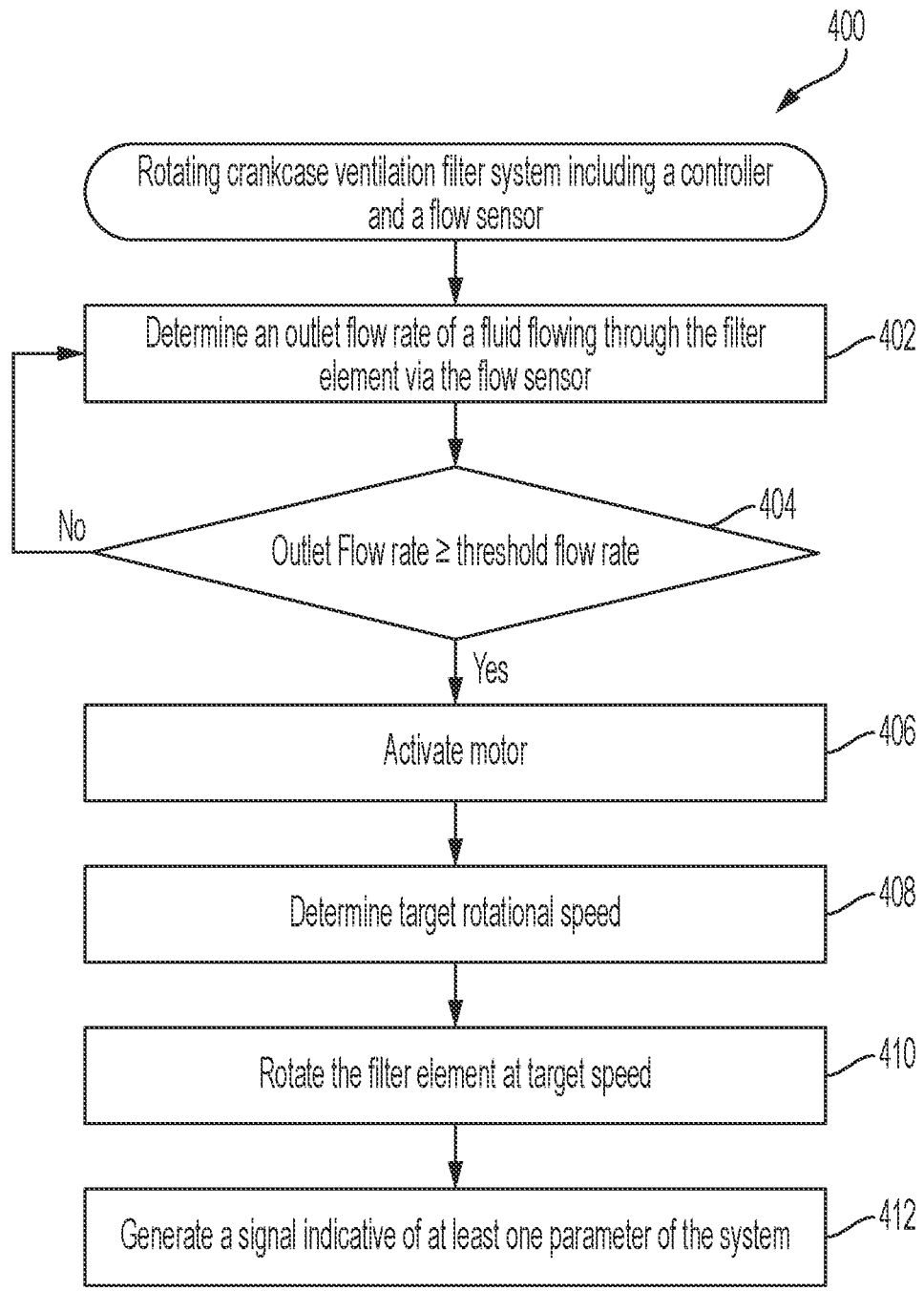
FIG. 5 is a schematic flow chart of a method for controlling operations of a crankcase ventilation system, according to an embodiment.

FIG. 5 is a schematic flow diagram of an example method 400 for controlling operations of the crankcase ventilation system 100, according to an embodiment. While described with respect to the system 100 and the controller 174, the operations of the method 400 may be performed with any other suitable controller (e.g., the controller 274) or employed in any crankcase ventilation system (e.g., the system 200).

The method 400 includes determining, by the controller 174, a flow rate of a fluid flowing through the filter element 130 via the sensor 175, at 402. At 404, the controller 174 determines whether the outlet flow rate is greater than or equal to a threshold flow rate. If the outlet flow rate is less than the threshold flow rate (404: NO), the method returns to operation 402. In response to the outlet flow rate being greater than or equal to the threshold flow rate (404: YES), at step 406 the controller 174 activates the motor 170 to cause the filter element 130 to rotate. In some embodiments, the controller 174 determines a target rotational speed based on the determined outlet flow rate, at 408. At 410, the controller 174 causes the motor 170 to rotate the filter element 130 at the target speed. In some embodiments, at step 412, the controller 174 may also generate one more signals indicative of at least one parameter (e.g., the outlet flow rate) of the system 100.

Figure 6:
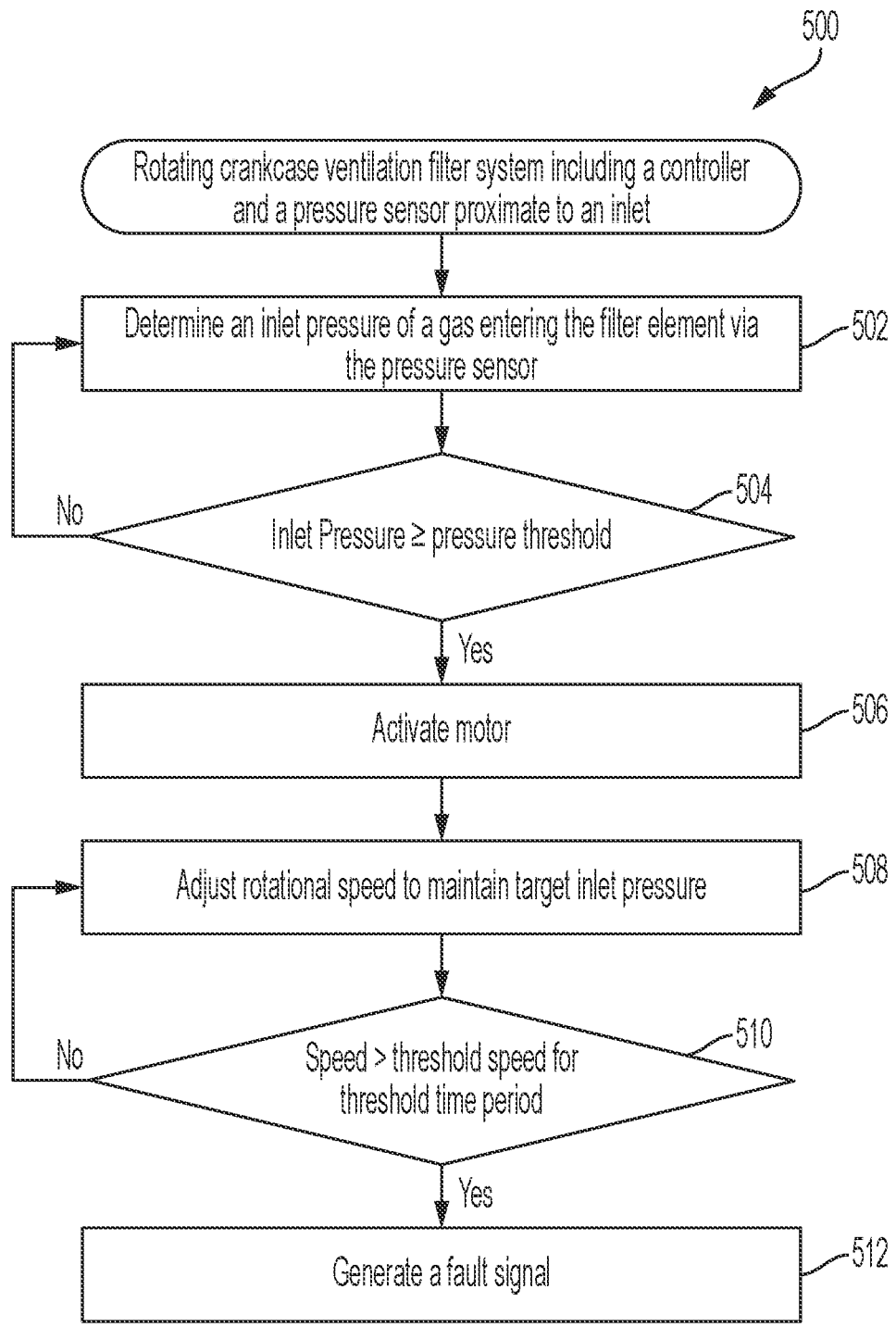
FIG. 6 is a schematic flow chart of a method for controlling operations of a crankcase ventilation system, according to another embodiment.

FIG. 6 is a schematic flow diagram of an example method 500 for controlling operation of the crankcase ventilation system 200, according to an embodiment. While described with respect to the system 200 and the controller 274, the operations of the method 500 may be performed with any other suitable controller (e.g., the controller 174) or employed in any crankcase ventilation system (e.g., the system 100).

The method 500 includes determining an inlet pressure of a gas entering the filter element 230 via the sensor 275, at 502. At 504, the controller 274 determines whether the inlet pressure is greater than or equal to a pressure threshold. If the inlet pressure is less than the pressure threshold (504: NO), the method returns to operation 502. In response to the inlet pressure being greater than or equal to the pressure threshold, the (504: YES), the controller 274 activates the motor 270, at 506. In some embodiments, the controller 174 adjusts a rotational speed of the motor 270 and thereby, the filter element 230, at 508, to maintain a target inlet pressure at the inlet 203 of the system 200.

In some embodiments, the method 500 also includes determining, by the controller 274 whether a rotational speed of the filter element 230 is greater than a threshold speed for a threshold time period, at 510. If the rotational speed returns to at or below the threshold speed within the threshold time period (510: NO), the method 500 returns to operation 508. In response to the rotational speed remaining to be greater than the threshold speed for the threshold time period (510: YES), at step 512, the controller 274 generates a fault signal indicative of the filter element 230 being plugged.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A rotating crankcase ventilation system, comprising:
   a housing comprising an inlet and an outlet;
   a motor comprising a stator and a rotor;
   a shaft, a first end of the shaft coupled to the rotor and configured to rotate in response to rotation of the rotor;
   a filter element coupled to the shaft;
   a sensor configured to measure at least one operating parameter of the rotating crankcase ventilation system, wherein the sensor comprises a pressure sensor coupled to the housing proximate the inlet and wherein the at least one operating parameter comprises an inlet pressure of a fluid flowing into the inlet, the sensor configured to measure the inlet pressure; and
   a controller operatively coupled to the sensor and the motor, the controller configured to receive the at least one operating parameter and selectively adjust operation of the motor to adjust the rotation of the rotor, and thereby the filter element, based on the at least one operating parameter, wherein the controller is configured to, responsive to the measured inlet pressure being greater than or equal to a predetermined threshold pressure, activate the motor.

2. The rotating crankcase ventilation system of claim 1, wherein selectively adjusting operation of the motor comprises moving the motor between a rest position, in which the rotor is stationary, and an activated position in which the rotor is rotating.

3. The rotating crankcase ventilation system of claim 1, wherein selectively adjusting operation of the motor comprises adjusting a rotational speed of an already rotating rotor.

4. The rotating crankcase ventilation system of claim 1, wherein:
the sensor further comprises a flow sensor and the at least one operating parameter further comprises an outlet flow rate of a fluid proximate to the outlet, the sensor being disposed in the housing proximate to the outlet and configured to measure the outlet flow rate; and
the controller is configured to, responsive to the measured outlet flow rate being greater than or equal to a predetermined flow threshold, activate the motor.

5. The rotating crankcase ventilation system of claim 4, wherein the controller is further configured to:
determine a target rotational speed of the filter element based on the measured outlet flow rate, and adjust a rotational speed of the rotor towards the target rotational speed.

6. The rotating crankcase ventilation system of claim 1, wherein the controller is further configured to adjust a rotational speed of the rotor to achieve a target inlet pressure based on the measured inlet pressure.

7. The rotating crankcase ventilation system of claim 1, wherein the controller is further configured to, responsive to a rotational speed of the rotor being greater than a threshold speed for a threshold period of time, generate a fault signal indicative of the filter element being plugged.

8. The rotating crankcase ventilation system of claim 1, wherein the controller is further configured to selectively adjust the operation of the motor absent an external electronic input from a central controller.

9. The rotating crankcase ventilation system of claim 1, wherein the controller is further configured to receive a signal from a remote sensor and selectively adjust the operation of the motor based on the received signal from the remote sensor.

10. A controller operatively coupled to the sensor of the rotating crankcase ventilation system of claim 1, the controller comprising:
a memory configured to store instructions;
one or more modules configured to measure at least one operating parameter of the rotating crankcase ventilation system; and
a processor communicably connected to the memory and configured to execute the instructions, which, when executed, cause the processor to selectively adjust operation of the motor of the rotating crankcase ventilation system by adjusting a rotation of the rotor of the motor, and thereby the filter element, based on one or more of the at least one operating parameter measured by the one or more modules.

11. The controller of claim 10, wherein the at least one operating parameter comprises at least one of a voltage provided to the motor, a current being consumed by the motor, a speed of the motor, a temperature of a volume of a housing, a temperature of a fluid flowing through the ventilation system, an outlet flow rate, and/or an inlet pressure.

12. The controller of claim 10, wherein:
The at least one operating parameter comprises an outlet flow rate of a fluid that is greater than or equal to a predetermined flow threshold; and
responsive to the outlet flow rate being greater than or equal to the predetermined flow threshold, the instructions cause the processor to activate the motor of the ventilation system.

13. The controller of claim 10, wherein the one or more modules are embodied as at least one of a hardware unit and a circuitry component.

14. The rotating crankcase ventilation system of claim 1 wherein the housing comprises a main body and an inlet conduit, wherein the pressure sensor is disposed between the main body and the inlet conduit.

15. A rotating crankcase ventilation system, comprising:
a housing comprising an inlet and an outlet;
a motor comprising a stator and a rotor;
a shaft, a first end of the shaft coupled to the rotor and configured to rotate in response to rotation of the rotor;
a filter element coupled to the shaft;
a sensor configured to measure at least one operating parameter of the rotating crankcase ventilation system;
a controller operatively coupled to the sensor and the motor, the controller configured to receive the at least one operating parameter and selectively adjust operation of the motor to adjust the rotation of the rotor, and thereby the filter element, based on the at least one operating parameter; and
an audio and/or visual indicator disposed on an outer surface of the housing, wherein:
the controller is configured to receive signals corresponding to real time values of at least one of a speed of the rotor, a current draw of the motor, a voltage of the motor, a temperature of the motor, and an internal volume of the housing and determine whether the rotating crankcase ventilation system is operating properly based on the received signals; and
the audio and/or visual indicator is configured to indicate whether the rotating crankcase ventilation system is operating properly.

16. A method of selectively controlling a motor of a rotating crankcase ventilation system, the method comprising:
receiving, by a controller of the rotating crankcase ventilation system, an operating parameter from a pressure sensor coupled to a housing of the rotating crankcase ventilation system proximate an inlet of the housing;
determining, by the controller, whether the operating parameter is greater than or equal to a threshold; and
activating, by the controller, the motor responsive to determining the operating parameter is greater than or equal to the threshold.

17. The method of claim 16, wherein the operating parameter further comprises an outlet flow rate of a fluid flowing through a filter element of the rotating crankcase ventilation system and the outlet flow rate is greater than or equal to a threshold flow rate, the method further comprising:
determining, by the controller, responsive to determining the outlet flow rate is greater than or equal to the threshold flow rate, a target rotational speed; and
rotating the filter element at the target rotational speed.

18. The method of claim 17, further comprising generating a signal indicative of the outlet flow rate.

19. The method of claim 16, wherein the operating parameter is an inlet pressure of a gas entering a filter element of the rotating crankcase ventilation system and the inlet pressure is greater than or equal to the threshold, the threshold being a threshold pressure, the method further comprising:
- adjusting, by the controller, a rotational speed of the motor to maintain a target inlet pressure based on the received inlet pressure.

20. The method of claim 19, further comprising:
- determining whether the rotational speed of the motor is greater than a threshold speed for a threshold time period; and
- generating, by the controller, responsive to determining the rotational speed is greater than a threshold speed for the threshold time period, a fault signal, the fault signal indicative of the filter element being plugged.

* * * * *